United States Patent
Botsinis et al.

(10) Patent No.: US 12,127,148 B2
(45) Date of Patent: Oct. 22, 2024

(54) MASTER INFORMATION BLOCK DECODING BASED ON SYNCHRONIZATION SIGNAL BLOCK TIMING

(71) Applicant: Apple Inc., Cupertino, CA (US)

(72) Inventors: Panagiotis Botsinis, Munich (DE); Sameh M. Eldessoki, Munich (DE); Christian Hofmann, Munich (DE); Rafael L Rivera-Barreto, Miami, FL (US); Tarik Tabet, Carlsbad, CA (US)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 17/951,882

(22) Filed: Sep. 23, 2022

(65) Prior Publication Data
US 2024/0098673 A1 Mar. 21, 2024

(30) Foreign Application Priority Data
Sep. 21, 2022 (GR) .............................. 20220100771

(51) Int. Cl.
- H04W 56/00 (2009.01)
- H04L 1/00 (2006.01)
- H04L 5/00 (2006.01)

(52) U.S. Cl.
CPC ....... *H04W 56/0055* (2013.01); *H04L 1/0045* (2013.01); *H04L 1/0071* (2013.01); *H04L 5/0051* (2013.01)

(58) Field of Classification Search
None
See application file for complete search history.

(56) References Cited

U.S. PATENT DOCUMENTS
2020/0196254 A1* 6/2020 Kerhuel ................ H04L 5/0048

FOREIGN PATENT DOCUMENTS
EP 3993476 5/2022
EP 3993476 A1 * 5/2022 ............ H04W 48/12

OTHER PUBLICATIONS

Intel Corporation, "Discussion on initial access aspects for extending NR up to 71 GHz"; 3GPP TSG RAN WG1 Meeting #105e, e-meeting, May 19-27, 2021, R1-2104894 (Year: 2021).*

(Continued)

*Primary Examiner* — Joseph A Bednash
(74) *Attorney, Agent, or Firm* — Fish & Richardson P.C.

(57) ABSTRACT

Methods, systems, and computer-readable mediums are configured to perform operations including detecting a plurality of synchronization signal blocks (SSBs) that are transmitted for a physical broadcast channel (PBCH), each of the SSBs having a SSB index comprising a set of bit values; detecting, from the plurality of SSBs, a first SSB received at a first time and a second SSB received at a second time that is different from the first time; decoding, for a first SSB of the plurality, first bit values of a first SSB index representing the first SSB and of a second SSB index representing the second SSB; determining, based on the first time and the second time, a receive time gap between the first SSB and the second SSB; and determining, based on the receive time gap and the first bit values of the first SSB index and the second SSB index, at least a second bit value of the first second SSB index representing the first SSB and the second SSB representing the second SSB.

20 Claims, 12 Drawing Sheets

(56) References Cited

OTHER PUBLICATIONS

Intel Corporation, "Discussion on initial access aspects for extending NR up to 71 GHz," 3GPP TSG RAN WG1 Meeting #105-e, R1-2104894, e-Meeting, May 19-27, 2021, 18 pages.

* cited by examiner

MASTER INFORMATION BLOCK DECODING BASED ON SYNCHRONIZATION SIGNAL BLOCK TIMING

CLAIM OF PRIORITY

This application claims priority under 35 U.S.C. § 119(b) to Greek Patent Application No. 20220100771, filed on Sep. 21, 2022, the entire contents of which are hereby incorporated by reference.

BACKGROUND

Wireless communication networks provide integrated communication platforms and telecommunication services to wireless user devices. Example telecommunication services include telephony, data (e.g., voice, audio, and/or video data), messaging, internet-access, and/or other services. The wireless communication networks have wireless access nodes that exchange wireless signals with the wireless user devices using wireless network protocols, such as protocols described in various telecommunication standards promulgated by the Third Generation Partnership Project (3GPP). Example wireless communication networks include code division multiple access (CDMA) networks, time division multiple access (TDMA) networks, frequency-division multiple access (FDMA) networks, orthogonal frequency-division multiple access (OFDMA) networks, Long Term Evolution (LTE), and Fifth Generation New Radio (5G NR). The wireless communication networks facilitate mobile broadband service using technologies such as OFDM, multiple input multiple output (MIMO), advanced channel coding, massive MIMO, beamforming, and/or other features.

SUMMARY

This document describes systems and processes for decoding master information blocks (MIBs) that are transmitted between devices. Fifth Generation (5G) New Radio (NR) systems are configured for transmission of data between user equipment (UE) and a network including a base station (e.g., a next generation node gNB). For transmission of data, a cell of the network is configured to transmit a plurality of synchronization signal blocks (SSBs) for a physical broadcast channel (PBCH) to the UE over a period of time. Generally, multiple SSBs of the target cell may have been received by the UE, even by different receiver (Rx) beams. The systems and processes described herein determine a time delay (also called a spacing) between received SSBs by the UE. Based on the measured time delay, the systems and processes described herein are configured to decode one or more bits of the index value(s) of the received SSBs without requiring the UE to decode or measure the entire transmitted signal. In some implementations, inferred value(s) of the one or more bits (e.g., most significant bits, or MSBs) of the SSBs can be compared to decoded values of the SSB for error checking. For example, accuracy of a polar decoder can be improved by providing more reference bit values of the MIB.

The details of one or more embodiments of these systems and methods are set forth in the accompanying drawings and the description below. Other features, objects, and advantages of these systems and methods will be apparent from the description and drawings, and from the claims.

DETAILED DESCRIPTION

Figure 1:
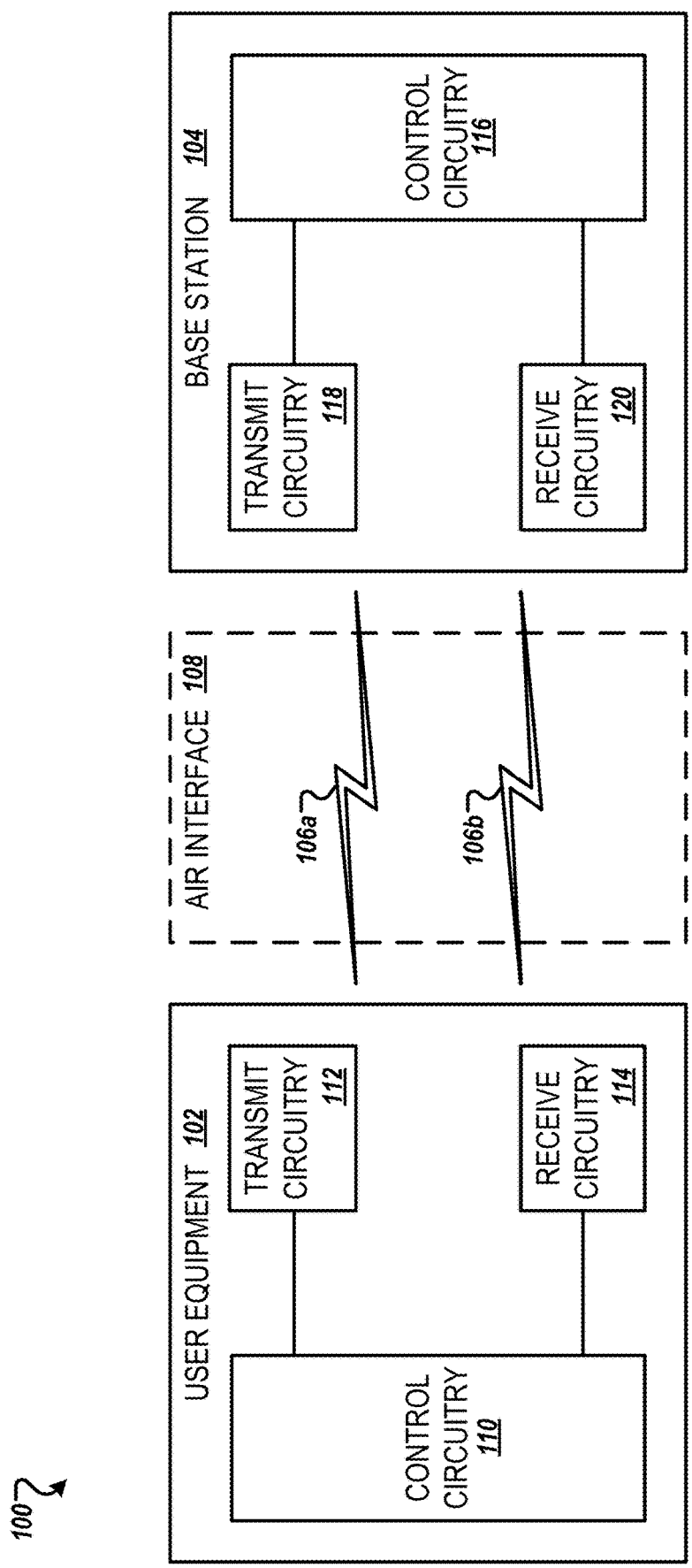
FIG. 1 illustrates a wireless network, in accordance with some embodiments.

This document describes systems and processes for decoding master information blocks (MIBs) that are transmitted between devices. Fifth Generation (5G) New Radio (NR) systems are configured for transmission of data between user equipment (UE) and a network including a base station (e.g., a next generation node gNB). For transmission of data, a cell of the network is configured to transmit a plurality of synchronization signal blocks (SSBs) for a physical broadcast channel (PBCH) to the UE over a period of time. Generally, multiple SSBs of the target cell may have been received by the UE, even by different receiver (Rx) beams. The systems and processes described herein determine a time delay (also called a spacing) between received SSBs by the UE. Based on the measured time delay, the systems and processes described herein are configured to decode one or more bits of the index value(s) of the received SSBs without requiring the UE to decode or measure the entire transmitted signal. In some implementations, inferred value(s) of the one or more bits (e.g., most significant bits, or MSBs) of the SSBs can be compared to decoded values of the SSB for error checking. For example, accuracy of a polar decoder can be improved by providing more reference bit values of the MIB.

A UE is configured to detect reception of at least two SSBs, each at a particular time in an SSB burst (e.g., SSB transmission period). Generally, the UE is configured to detect reception of as many SSBs as possible in the SSB burst. The processes described herein are applicable when at least two SSBs are received and detected. In some configurations, the transmission period can be 5 milliseconds. Generally, each SSB in the period of the SSB transmission is assigned an SSB index, which is a unique number starting from 0 and increasing by 1. The index value is reset to 0 in the next SSB set, such as during a subsequent 5 millisecond (ms) span after the SSB transmission cycle (e.g., 20 ms). In Frequency Range 2 (FR2), the SSB index is carried partially within the SSB by a PBCH DMRS (a defined SSB parameter) and partially within the PBCH Payload.

The UE determines a symbol spacing of the SSBs corresponding to a period of time between respective receptions of each of the SSBs. The transmission pattern of the SSB burst set is known to the UE because it depends on the center frequency and the subcarrier spacing (SCS) associated with the received SSB burst. The frequencies can be for Frequency Range 1 (FR1), Frequency Range 2 (FR2), and so forth. The SCS can be 15 kilohertz (kHZ), 30 kHz, 120 kHz, 240 kHz, and so forth. The determination is also based on a bit interleaving sequence of the PBCH, which is known to the UE. In addition, the three MSBs of an SSB index in FR2 are not scrambled before being fed to a polar encoder.

Based on the symbol spacing and the known interleave pattern, the UE is configured to determine possible values (e.g., of MSBs) for each of the respective SSB indices. In some implementations, the exact values for one or more bits of the SSB index values are not decoded, but instead the UE can determine whether corresponding bits are both high ("1"), both low ("0"), or opposite values at a given position in the SSB index without having to decode the MSBs of the SSBs. Once one of the bit values is decoded, the corresponding bit value is inferred. The inferred value can be checked against the decoded value for error checking or for improving the decoder.

In some implementations, the UE is configured to determine 1, 2 or 3 MSBs of an SSB index, which are located in the additional PBCH payload. The UE exploits the relative positions of the detected SSBs in the SSB burst based on their receive time difference. In some implementations, the UE determines the three least significant bits (LSBs) of the SSB index of the detected SSBs, obtained by the demodulation reference signal (DMRS) detection. For example, assuming that 1, 2, or 3 MSBs of an SSB's index are determined and are known to the UE prior to MIB decoding. More specifically, these 1, 2, or 3 MSBs of the SSBs are not scrambled before being input into the encoder of the UE, and the values of these MSBs is still known to the UE when the bits are input to the decoder of the UE. The known MSBs of the SSBs can be used as additional frozen bits in order to improve the error correction performance of the decoder. In some implementations, these bits are used as additional bits for error detection, similar to cyclic redundancy check (CRC) bits, in order to improve error detection performance by the UE. The UE can use these bits in scenarios in which the UE is decoding a MIB of a specific target cell on an FR2 (or FR1) layer. The UE can use these bits in any scenario in which at least one of the three MSBs of an SSB index can be inferred.

FIG. 1 illustrates a wireless network 100, in accordance with some embodiments. The wireless network 100 includes a UE 102 and a base station 104 connected via one or more channels 106A, 106B across an air interface 108. The UE 102 and base station 104 communicate using a system that supports controls for managing the access of the UE 102 to a network via the base station 104.

For purposes of convenience and without limitation, the wireless network 100 is described in the context of Long Term Evolution (LTE) and Fifth Generation (5G) New Radio (NR) communication standards as defined by the Third Generation Partnership Project (3GPP) technical specifications. More specifically, the wireless network 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless network 100 may also be a Standalone (SA) network that incorporates only NR. Furthermore, other types of communication standards are possible, including future 3GPP systems (e.g., Sixth Generation (6G)) systems, Institute of Electrical and Electronics Engineers (IEEE) 802.11 technology (e.g., IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies), IEEE 802.16 protocols (e.g., WMAN, WiMAX, etc.), or the like. While aspects may be described herein using terminology commonly associated with 5G NR, aspects of the present disclosure can be applied to other systems, such as 3G, 4G, and/or systems subsequent to 5G (e.g., 6G).

In the wireless network 100, the UE 102 and any other UE in the system may be, for example, laptop computers, smartphones, tablet computers, machine-type devices such as smart meters or specialized devices for healthcare monitoring, remote security surveillance systems, intelligent transportation systems, or any other wireless devices with or without a user interface. In network 100, the base station 104 provides the UE 102 network connectivity to a broader network (not shown). This UE 102 connectivity is provided via the air interface 108 in a base station service area provided by the base station 104. In some embodiments, such a broader network may be a wide area network operated by a cellular network provider, or may be the Internet. Each base station service area associated with the base station 104 is supported by antennas integrated with the base station 104. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector.

The UE 102 includes control circuitry 110 coupled with transmit circuitry 112 and receive circuitry 114. The transmit circuitry 112 and receive circuitry 114 may each be coupled with one or more antennas. The control circuitry 110 may be adapted to perform operations associated with selection of codecs for communication and to adaption of codecs for wireless communications as part of system congestion control. The control circuitry 110 may include various combinations of application-specific circuitry and baseband circuitry. The transmit circuitry 112 and receive circuitry 114 may be adapted to transmit and receive data, respectively, and may include radio frequency (RF) circuitry or front-end module (FEM) circuitry, including communications using codecs as described herein.

In various embodiments, aspects of the transmit circuitry 112, receive circuitry 114, and control circuitry 110 may be integrated in various ways to implement the circuitry described herein. The control circuitry 110 may be adapted or configured to perform various operations such as those described elsewhere in this disclosure related to a UE. The transmit circuitry 112 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 112 may be configured to receive block data from the control circuitry 110 for transmission across the air interface 108. Similarly, the receive circuitry 114 may receive a plurality of multiplexed downlink physical channels from the air interface 108 and relay the physical channels to the control circuitry 110. The plurality of downlink physical channels may be multiplexed according to TDM or FDM along with carrier aggregation. The transmit circuitry 112 and the receive circuitry 114 may transmit and receive both control data and content data (e.g., messages, images, video, etc.) structured within data blocks that are carried by the physical channels.

FIG. 1 also illustrates the base station 104. In embodiments, the base station 104 may be an NG radio access network (RAN) or a 5G RAN, an E-UTRAN, a nonterrestrial cell, or a legacy RAN, such as a UTRAN or GERAN. As used herein, the term "NG RAN" or the like may refer to the base station 104 that operates in an NR or 5G wireless network 100, and the term "E-UTRAN" or the like may refer to a base station 104 that operates in an LTE or 4G wireless network 100. The UE 102 utilizes connections (or channels) 106A, 106B, each of which includes a physical communications interface or layer.

The base station 104 circuitry may include control circuitry 116 coupled with transmit circuitry 118 and receive circuitry 120. The transmit circuitry 118 and receive circuitry 120 may each be coupled with one or more antennas that may be used to enable communications via the air interface 108.

The control circuitry 116 may be adapted to perform operations for analyzing and selecting codecs, managing congestion control and bandwidth limitation communications from a base station, determining whether a base station is codec aware, and communicating with a codec-aware base station to manage codec selection for various communication operations described herein. The transmit circuitry 118 and receive circuitry 120 may be adapted to transmit and receive data, respectively, to any UE connected to the base station 104 using data generated with various codecs described herein. The transmit circuitry 118 may transmit downlink physical channels includes of a plurality of downlink subframes. The receive circuitry 120 may receive a plurality of uplink physical channels from various UEs, including the UE 102.

In this example, the one or more channels 106A, 106B are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In embodiments, the UE 102 may directly exchange communication data via a ProSe interface. The ProSe interface may alternatively be referred to as a SL interface and may include one or more logical channels, including but not limited to a PSCCH, a PSSCH, a PSDCH, and a PSBCH.

Figure 2:
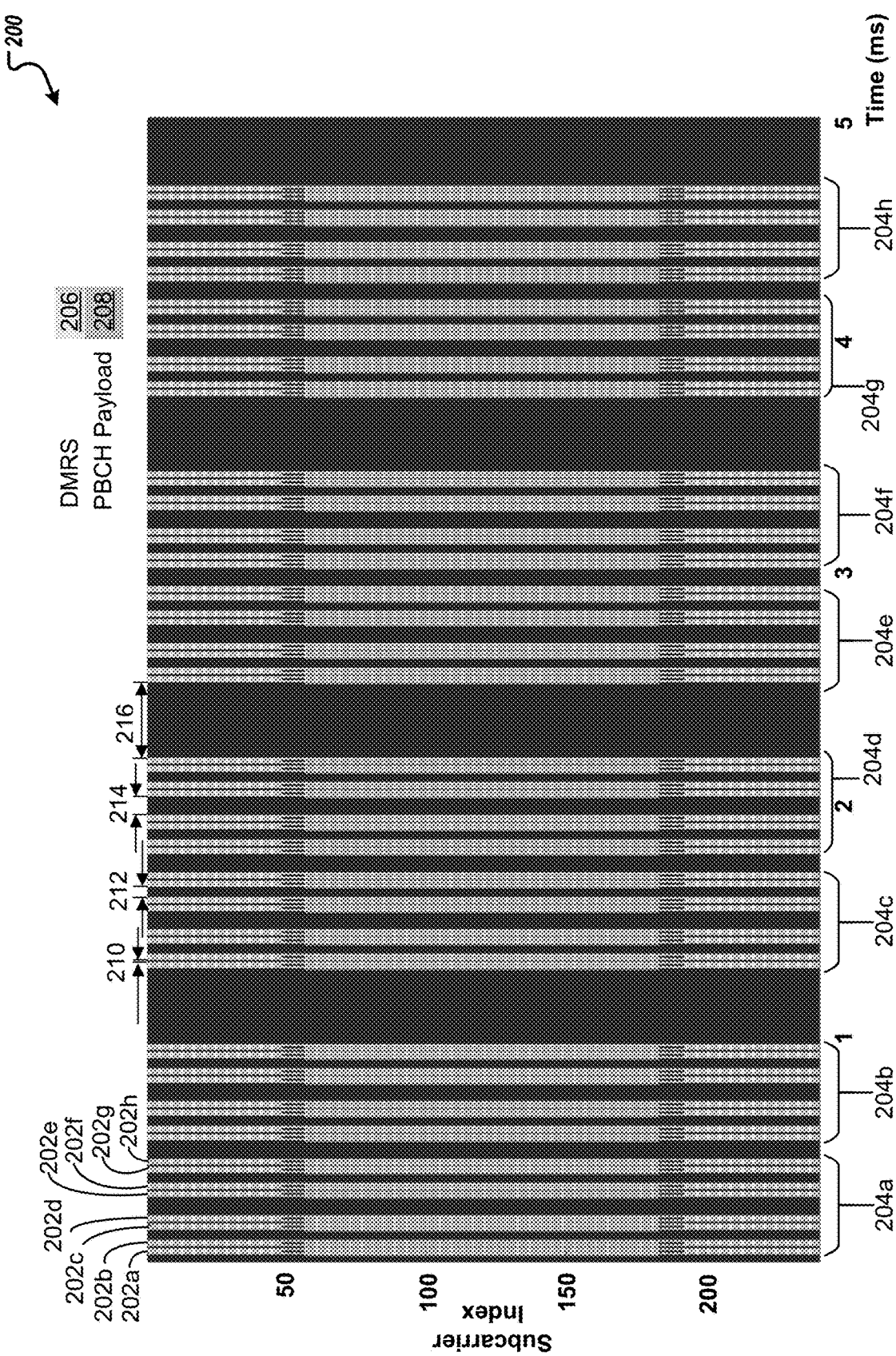
FIG. 2 illustrates a frequency time grid showing examples of SSBs and receive times for the received SSBs.

FIG. 2 illustrates a frequency time grid showing examples of an SSB set 200 of SSBs transmitted by a network (e.g., base station 104) to a UE (e.g., UE 102) during an SSB transmission period. One or more SSBs of the SSB set 200 may be detected and received by the UE. The SSB set 200 includes 64 blocks. The 64 blocks of the set 200 are indexed by MSBs and least significant bits (LSBs). The MSBs and LSBs of an SSB index correspond to the SSBs of the set 200. Generally, for a set 200 including 64 SSBs, each SSB is associated with an SSB index of 6 bits. The 3 MSBs of an SSB index are including in the PBCH payload 208. The 3 LSBs of that SSB index are encoded in the selection of the transmitted DMRS sequence 206.

The LSBs are part of the DMRS sequence transmitted by the network, and the MSBs are part of the PBCH payload, each being received by the UE. A subcarrier index value can range from 0-255. The individual SSBs (e.g., SSBs 202a-h) are spaced over time at a known distance from one another depending on the carrier frequency and SCS of the transmission.

The MSBs and LSBs increment for each block of the SSB set 200 in a repetitive pattern. The MSBs group the individual blocks 202 into octaves. Each octave 204a-h includes eight individual blocks 202a-h (only the blocks of octave 204a are labeled in FIG. 2). The value of the MSBs for the blocks 202 increments for each subsequent octave. For example, eight octaves 204a-h are shown, each associated with an incrementing value of the MSBs. Specifically, each block 202a-h of octave 204a has a same MSB value of 000. Each block 202a-h of octave 204b has a same MSB value of 001. Each block 202a-h of octave 204c has a same MSB value of 010. Each block 202a-h of octave 204d has a same MSB value of 011. Each block 202a-h of octave 204e has a same MSB value of 100. Each block 202a-h of octave 204f has a same MSB value of 101. Each block 202a-h of octave 204g has a same MSB value of 110. Each block 202a-h of octave 204h has a same MSB value of 111. Additionally, for each octave 204a-h, the LSBs of the blocks 202a-h increment between 000-111 such that each block is uniquely indexed by its MSBs and LSBs. This pattern repeats after octave 204h.

The SSBs of the SSB set 200 have a known symbol spacing. The SCS is the frequency in kHz between two subsequent subcarriers. The UE uses the SCS to determine which SSB burst set pattern is used, which specifies the number of symbols between two consecutive SSBs. The UE already knows the information of the SCS configuration prior to receiving the SSB burst 200. The number of symbols between two given blocks, is based on the frequency of the transmission and on the SCS. In FIG. 2, a time in milliseconds is shown on an x-axis of the image. The SSB burst set 200 is a specific example, which is associated with an SCS having a value of 120 kHz. While an SSB burst set that is associated with SCS value of 240 kHz will have a different appearance in the frequency time grid, the systems and processes described herein can work in a similar manner. The gaps 210, 212, 214, and 216 between different blocks 202 are preconfigured by the network and known to the UE. For example, blocks 202a and 202b are separated in time by gap 210. Gap 210 can be repeated between blocks of each subsequent pair of blocks in an octave 204, such as between blocks 202a-b, blocks 202c-d, blocks 202e-f, and blocks 202g-h. Gap 212 is longer than gap 210 and is between the blocks paired by gap 210. For example, gap 212 occurs between blocks 202b and 202c and between blocks 202f and 202g for each octave 204a-h. Gap 214 is longer than gaps 210 and 212 and occurs after each four blocks for two consecutive octaves. For example, gap 214 occurs between blocks 202d and 202e of each octave, and after a first octave 204 and before the next octave 204 for each pair of octaves, such as between octaves 204a and 204b, octaves 204c and 204d, octaves 204e and 204f, and octaves 204g and 204h. Gap 216 is longer than any of gaps 210, 212, and 214. Gap 216 occurs after octave pairs that are paired by gaps 214. For example, gap 216 occurs between octaves 204b and 204c, between octaves 204d and 204e, and between octaves 204f and 204g for each SSB set 200. Each gap 210, 212, 214, and 216 corresponds to a particular number of symbols that is known to the UE that detects the SSBs of the set 200. The gap lengths (e.g., in time) are based on the carrier frequency (FR1) and the SCS (FR1 and FR2) of the SSBs.

The UE is configured to receive SSBs from the network and decode at least portions of the blocks 202. The UE is able to determine which SSB is detected in the set 200, without any additional information, if the UE decodes the SSB index of a block 202 including all of the MSBs and the LSBs. When the UE detects multiple SSBs, the UE is configured to infer one or more bits of the SSB index based on the timing distance between the first detected SSB and the second detected SSB in the set 200. Various examples of inferring bits of the SSB index are described in relation to FIGS. 3-6D.

When the UE detects at least two SSBs, the UE can infer the values of one or more bits of each SSB index. The UE can determine, based on the time difference between each reception of each detected SSB, whether one or more bits of each SSB index in a given position in the index are always the same values, are always opposite values, or are sometimes the same values. For example, if two SSBs are detected in the same octave 204, the UE determines that all three of the MSBs are the same values for each of the SSB indexes, and that at least one LSB differs between the two SSB indexes. Specifically, if two SSBs are detected in octave 204a, the UE determines that the values for all the MSBs of the PBCH payload are "000" for both SSBs. The UE determines that the SSBs are in octave 204a by decoding the index (or a portion thereof) for at least one SSB. Based on the value of the index, the UE determines an absolute position of the SSB in the group 200. The UE determines that the spacing between the SSBs indicates that the two received SSBs are in the same octave 204a, such as by comparing the reception times to known gap values 210, 212, 214, and 216. The UE can thus infer bit values for both the LSB and the MSB of a SSB index without decoding the entire SSB index. As previously stated, the UE can decode the values of the inferred bits of the SSB index (or a second SSB index) for error correction or for improving the decoder.

Figure 3:
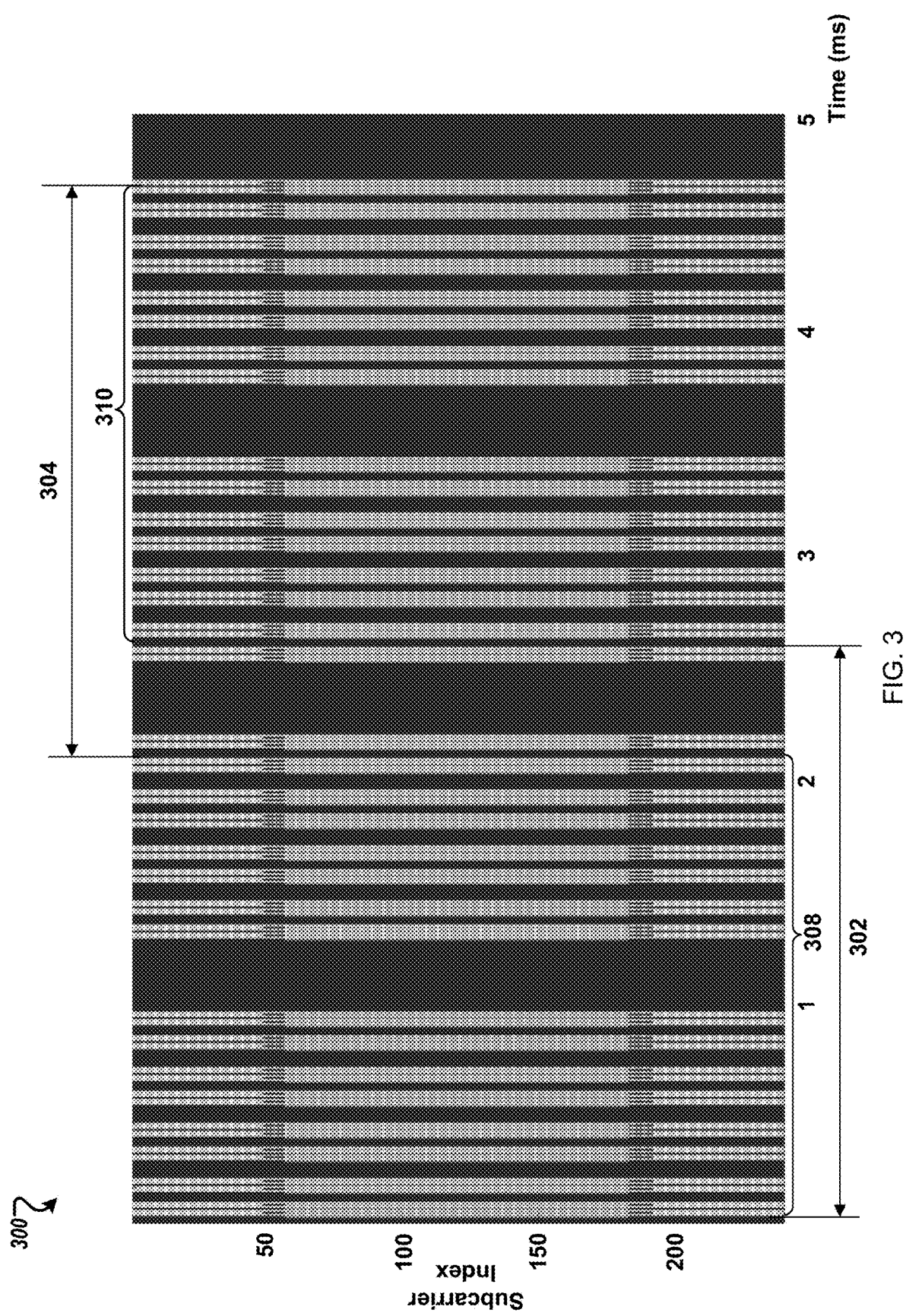
FIG. 3 illustrates a frequency time grid showing an example for decoding values for MIBs based on receive times for respective SSBs.

FIG. 3 illustrates an example SSB set 300 (similar to SSB set 200). A UE (e.g., UE 102) is configured to decode values for MIBs based on receive times for respective SSBs in the set 300. A first SSB and a second SSB are detected by the UE, and the first and second SSBs are spaced apart by a given number of symbols. Based on detection and receipt of two SSBs, and prior to decoding any bits in the PBCH payload of each SSB, the UE has information indicating the spacing of the two SSBs in terms of the number of symbols between the two detected SSBs. The UE has information describing the spacing between received SSBs and the known gaps (e.g., gaps 210, 212, 214, and 216 described in relation to FIG. 2) of the pattern of the SSB set 300. From this information, the UE determines how the SSB index values of the received SSBs are related. For example, the UE determines whether the MSB and LSBs, represented in the SSB indexes of the received SSBs, are the same or different from each other for the two respective SSBs. In some implementations, the UE determines the relationship between the bits of the SSBs even without determining the absolute position of either SSB within the SSB set. Without decoding either SSB index, the UE has not yet determined exactly where in the SSB burst the first received SSB is located because the UE does not have information indicative of exactly when the SSB set 300 is transmitted from the base station.

Based on the time difference between the two detected SSBs, the UE determines or derives that the first SSB has an index within a first range, and the second SSB has an index within a second range. For example, as shown in FIG. 3, a time difference between two received SSBs is 284 OFDM symbols, shown by time period 302 and time period 304. In this example, if the first received SSB corresponds to index value "000" for the MSBs and values "000" for the LSBs, or the first SSB in the SSB set 300, then the lowest value for the second index of the second SSB would correspond to an SSB received after period 302 and within period 304. Conversely, if the second SSB corresponds to the last SSB index having MSBs values "111" and LSBs having values of "111", then the latest that the first SSB can be in the SSB set 300 is prior to period 304 and within period 302. As shown in FIG. 3, for this example spacing between the first and second SSBs, the first SSB corresponds to one of the SSBs in the period 308, and the second SSBs corresponds to one of the SSBs in period 310. Periods 308 and 310 can be larger or smaller depending on the time difference between the first and second detected SSBs.

Based on the time difference between the two detected SSBs, the UE determines that the first detected SSB's index is in the range {0, 29}, while the second detected SSB has an index value in the range {34, 63}. The UE can partially decode one or both of the index values to determine bit values in the one or more index values. In some implementations, the UE can fully decode at least one of the index values. Based on the decoded bits of the SSB indexes, the UE can determine the expected values of the remaining bits of the one or more SSB indexes that have not been decoded. In an example, a first MSB of the SSB index of a first detected SSB is equal to 0. In this example, a first MSB of the SSB index of the second detected SSB is equal to 1. As a result the UE can determine expected values of one or more of the remaining bits of the first and second SSB indexes. If the UE decodes the MIB based on the receive samples of the first detected SSB, the UE is can freeze the specific bit in the polar decoder, which corresponds to the first MSB of the SSB index, to the value 0. Similarly, if the UE decodes the MIB based on the receive samples of the second detected SSB, the UE can freeze the specific bit in the polar decoder, which corresponds to the first MSB of the SSB index, to the value 1. If a receive time difference between two detected SSBs is greater than half the duration of the SSB burst, then the first MSB of the SSB index of the first detected SSB is equal to 0, while the first MSB of the second detected SSB is equal to 1. The UE can automatically determine that the first MSB of the second detected SSB is equal to 1 without directly decoding the first SSB value. Based on the specific time gap corresponding to a combination of gaps 210, 212, 214, and/or 216, described in relation to FIG. 2, the UE can automatically predict values of other bits in the first or second SSB index value based on decoding one or more bits of the other SSB index.

Figure 4:
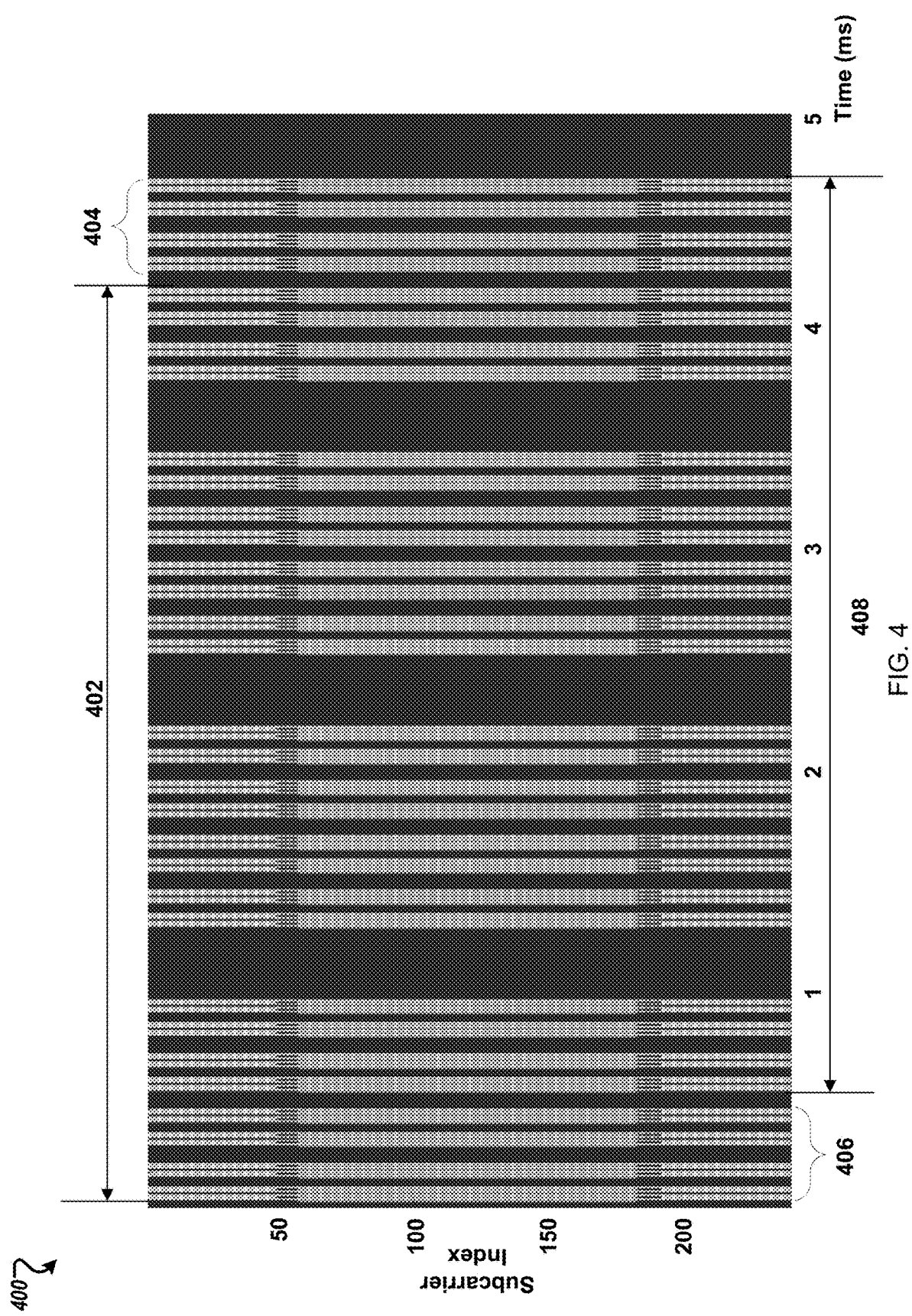
FIG. 4 illustrates a frequency time grid showing an example for decoding values for MIBs based on receive times for respective SSBs.

FIG. 4 illustrates an example SSB set 400 (similar to SSB sets 200 and 300). A UE (e.g., UE 102) is configured to decoding values for MIBs based on receive times for respective SSBs of the SSB set 400. In the example shown in FIG. 4, the UE detects a first SSB and a second SSB with a large time gap between them. In this illustrative example, the time delay between the first and second SSBs is at least 465 symbols. The number of symbols in the time gap is based on the particular frequency. For example, the frequency can be in FR2 such that the time difference between two detected SSBs in FR2 a subcarrier spacing at 120 kHz is greater than or equal to 465 OFDM symbols. If this is the case, the first SSB is one of the SSBs in the range 406 in FIG. 4, and the second SSB is within the range 404 of FIG. 4. The gap of 465 symbols is represented by gap 402, showing an earliest possible receipt of the first SSB in the SSB burst 400. The gap 408 shows a representation of the latest possible receipt of the first SSB in the SSB burst 400. The length of the gaps 404, 408 constrains the receipt of the first SSB within period 406 and the second SSB within period 404. Based on this time gap between SSBs, the UE determines, without requiring a decoding of the SSB index values, that the three MSBs of the SSB index of the first detected SSB in range 406 are equal to 000. Correspondingly, the UE determines that the three MSBs of the SSB index of the second detected SSB are equal to 111.

The consequence of this inference of the first three bits of each SSB index for each detected SSB is that if the UE tries to decode the MIB based on the receive samples of the first detected SSB, it may freeze the specific bits in the polar decoder, which correspond to the three MSBs of the SSB index, to the value 0. Correspondingly, if the UE tries to decode the MIB based on the receive samples of the second detected SSB, it may freeze the specific bits in the polar decoder, which correspond to the three MSBs of the SSB index, to the value 1. The increased number of frozen bits thus improve the decoder's error correction performance and increase the probability of correctly decoding the remaining MIB and PBCH payload bits. In addition, the UE can use the inferred values for error checking as previously described.

Figure 5:
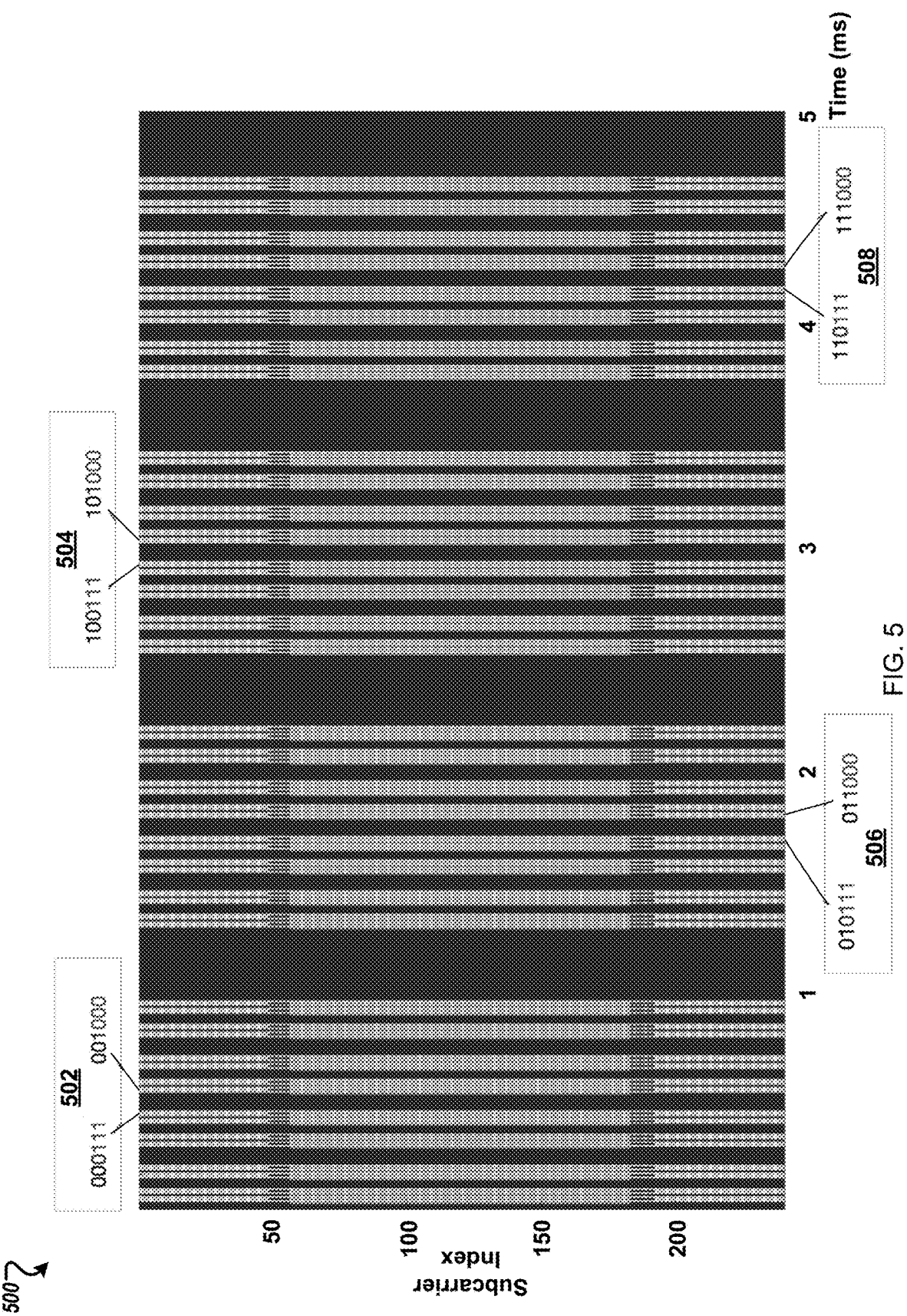
FIG. 5 illustrates a frequency time grid showing an example for decoding values for MIBs based on receive times for respective SSBs.

FIG. 5 illustrates an example SSB burst set 500 (similar to SSB sets 200, 300, and 400). A UE (e.g., UE 102) is configured for decoding values of the SSB indexes of the set 500 for MIBs based on receive times for at least two respective SSBs. In this example, the UE is configured to infer the values of the MSBs of an SSB index after obtaining the LSBs of the SSB index from the DMRS sequence. For the illustrated examples, the timing gap corresponds to 5 OFDM symbols (e.g., gap 214 of FIG. 2). However, the number of symbols for the detected time gap depends on the frequency and subcarrier spacing and can be different than 5 OFDM symbols. After the UE determines that the LSBs of the SSB index of two received SSBs are 111 and 000 respectively, the UE infers that both these SSBs have the last MSB of the SSB index is 0 and 1, respectively. For the first example, shown by SSB pair 502, the UE determines that the LSB values for the first SSB index are 111 and that the LSB values for the second SSB index are 000. Based on these LSB values, the UE infers that the third MSB value for the first SSB index is 0 and the third MSB value for the second SSB index is 1. The UE freezes the bit in the polar decoder that corresponds to the last MSB of the selected SSB for which PBCH decoding will be performed to its corresponding value (i.e., to 0 if the first SSB was selected or to 1 if the second SSB was selected) and decodes the first two MSB values as 00. Similarly, for each of example SSB pairs 504, 506, and 508, the third MSB of the SSB index of the first detected SSB is equal to 0, and the third MSB of the SSB index of the second detected SSB is equal to 1.

In each of examples for SSB pairs 502, 504, 506, and 508, if the UE decodes the MIB based on the receive samples of the first detected SSB, the UE may freeze the specific bit in the polar decoder, which corresponds to the third MSB of the SSB index, to the value 0. If the UE decodes the MIB based on the receive samples of the second detected SSB, the UE may freeze the specific bit in the polar decoder, which corresponds to the 3rd MSB of the SSB index, to the value 1. As a result, decoding performance of the decoder is reduced in complexity and more accurate. The inferred values of the SSB index bits can be stored in a lookup table that is referenced based on the decoded values of the SSB indexes.

FIGS. 6A-6D show examples of received SSBs at a UE (e.g., UE 102 of FIG. 1) of an SSB burst 600. The UE is configured to determine one or more values of the SSB indexes of each received SSB without decoding the entire SSB index of each received or detected SSB. The base station (e.g., base station 104 of FIG. 1) is configured to control a number of transmitted SSBs and the respective index values. The base station selects which SSBs to transmit. Generally, a subset of the possible SSBs of set 600 are transmitted, and not all 64 possible SSBs are necessarily transmitted by the base station in the SSB burst 600. In the scenarios described in relation to FIGS. 6A-6D, the UE detects or receives one or two SSBs. However, the UE can detect any number of SSBs transmitted by the base station and apply similar approaches used for two or more SSBs as described previously and subsequently. When additional SSBs are received, the possible options for SSB index values of additional received SSBs are further constrained based on the additional gap information that is measured by the UE. In scenarios with three or more detected SSBs, UE can determine additional bit values of the received SSBs without having to decode those bits. In some implementations, the UE is configured to decode an SSB index (or portion thereof) of a single SSB. The UE can use these decoded value(s), in combination with timing gap information for a plurality of other SSBs. Based on the decoded values and timing information, the UE can determine the value of the SSB index (or a portion thereof) for an index value of one or more respective SSBs. In some implementations, the UE can determine the SSB index value for the one or more respective SSBs of the plurality without decoding any bits of those one or more respective SSB indices.

Figure 6A:
FIGS. 6A-6D each illustrate a frequency time grid showing an example scenario for decoding values for MIBs based on receive times for respective SSBs.

FIG. 6A shows a first SSB 601 detected by the UE. The first SSB 601 has MSBs 602 having unknown values. The first SSB 601 has LSBs 604 having unknown values. Because only one SSB is detected by the UE, the UE decodes all the bits 602, 604 of the SSB index. For illustrative purposes in FIGS. 6A-6D, MSBs are shown above the frequency time grid for an SSB, and LSBs are shown below the frequency time grid for an SSB, but these values are generally not actually mapped on the specific frequency-time grid from the top and the bottom. In this example, the LSBs are decoded as 100 and subsequently the MSBs are decoded as 000, for an SSB index value of 000100. The UE decoding speed and power consumption are represented by a baseline performance value P1, in which the three MSBs, which are in the PBCH payload and the whole MIB are decoded directly.

Figure 6B:
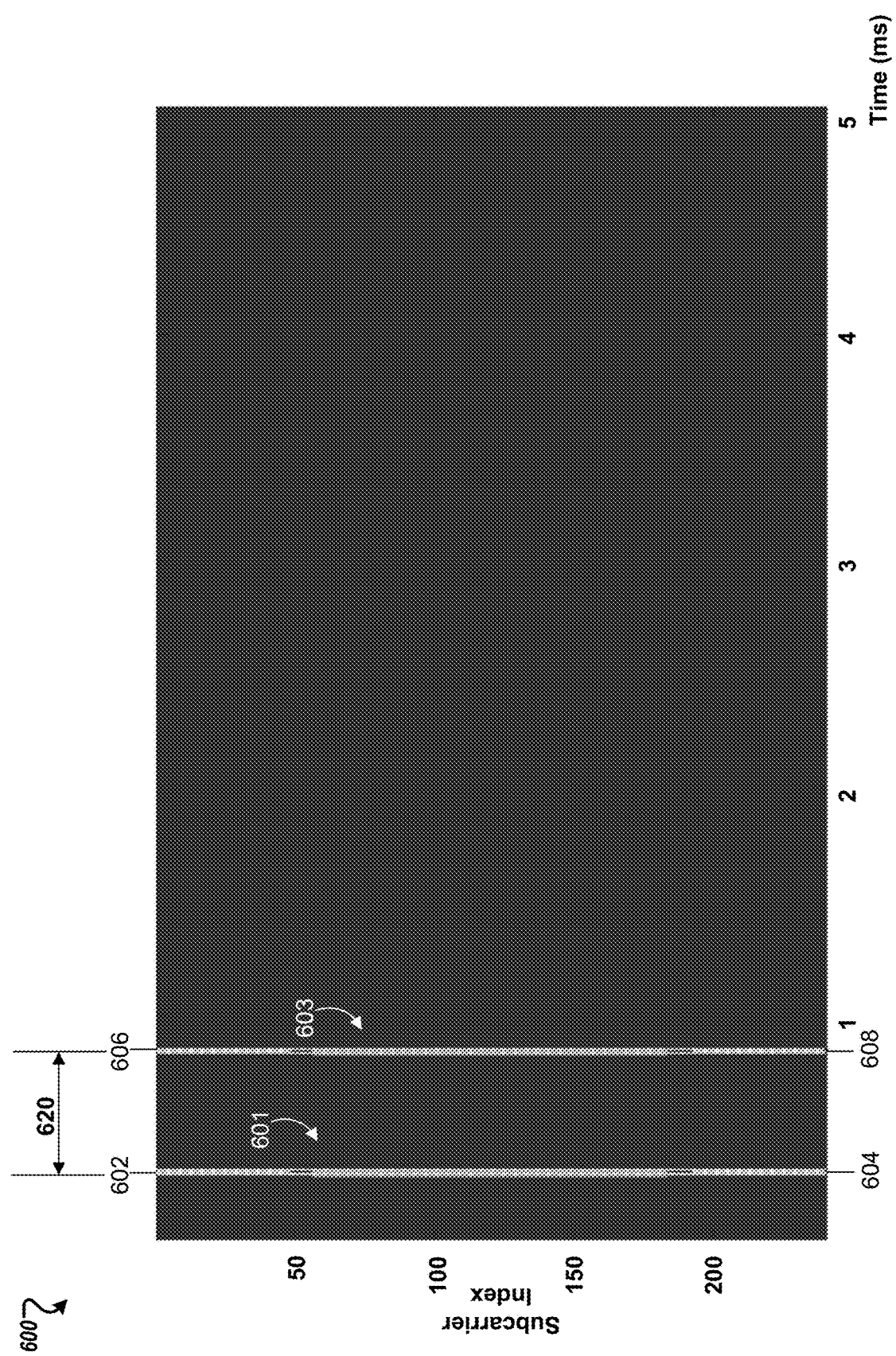

FIG. 6B shows a scenario for the SSB burst 600 in which the UE (e.g., UE 102) detects a first SSB 601 and a second SSB 603. Generally, the UE detects the LBS for each SSB, and the MSBs can be inferred based on the decoded LSBs and the receive time difference of the SSBs. As stated in relation to FIG. 6A, SSB 601 has MSB values 602 and LSB values 604. The UE decodes the LSBs for the first SSB are 100 and the values for the LSBs for the second SSB are 101. The index value for SSB 601 in this example is 000100. In this example, a second SSB 603 is received, also having MSBs 606 and LSBs 608. For the second SSB 603, the index is 001101. In this scenario, the UE decodes the third MSB bit of MSBs 602 and 606. For the first SSB, the UE determines, based on the timing gap 620 between the first SSB 601 and the second SSB 603, and the values of the LSBs for each of the first SSB 601 and the second SSB, that the MSBs of the first SSB are XY0, and that the MSBs of the second SSB are XY1. In other words, the first and second MSB values for each of SSBs 601, 603 are the same as one another (either both having a value of 0 or both having a value of 1). However, the third MSB values for each SSB 601, 603 are known to be 0 and 1, respectively. The detected second SSB assisted the UE in determining the values of the MIB. In this case, the UE can infer up to five bits for a particular SSB and three bits for the other SSB. The UE can freeze the inferred bit values in the decoder to assist the decoder performance. The decoding speed and power consumption are represented by a performance value P2, which is improved over P1 (e.g., lower power consumption and/or faster decoding speed).

Figure 6C:
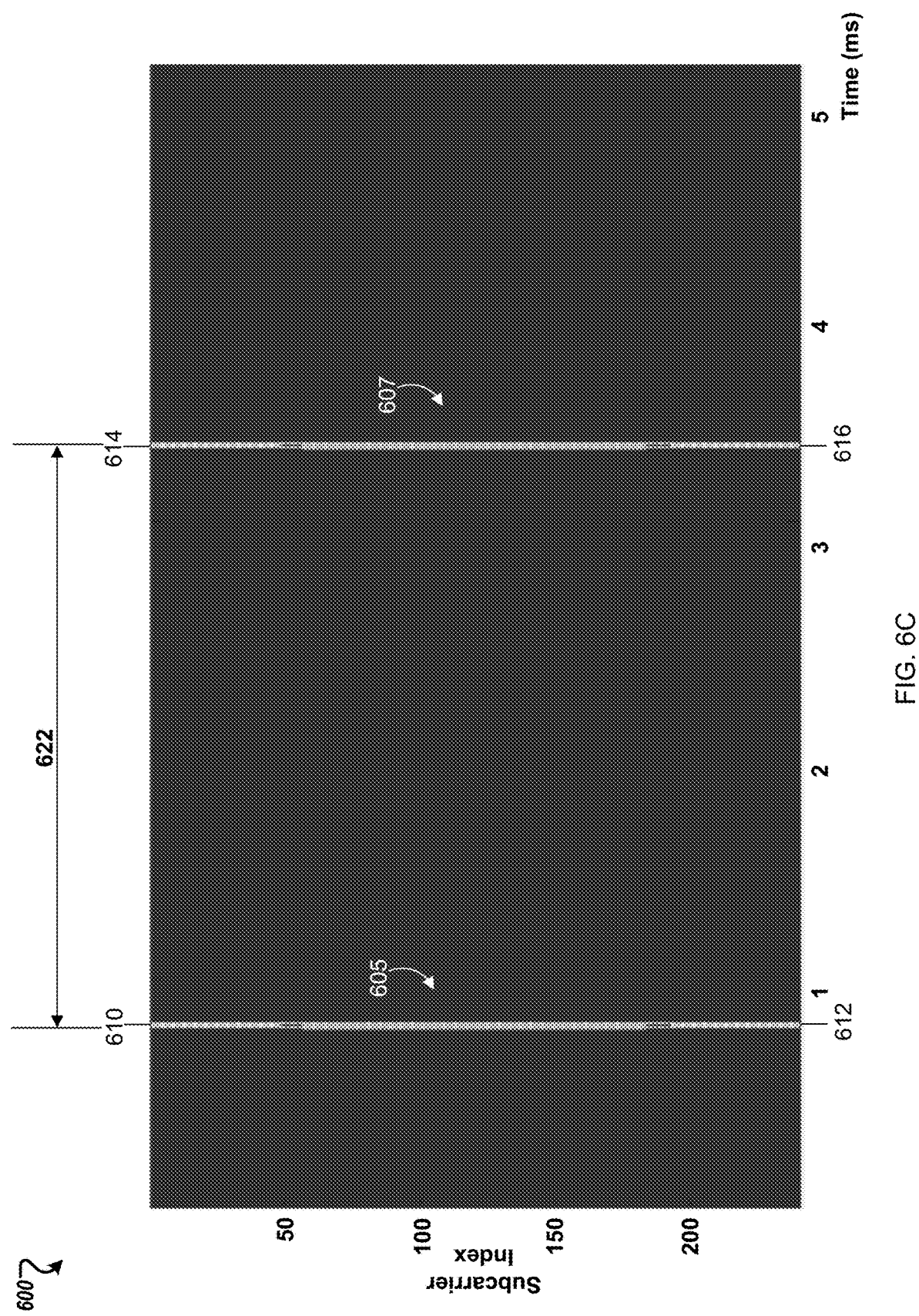

FIG. 6C shows a scenario for decoding SSBs of an SSB burst 600 by the UE. The base station sends two SSBs 605, 607, with respective indices 001100 and 100101. The MSBs 610 of the first SSB 605 are equal to values 001, and the LSBs 612 of the first SSB 605 are equal to values 100. The MSBs 614 of the second SSB 607 are equal to values 100, and the LSBs 616 of the second SSB 605 are equal to values 101. The UE determines the values of the LSBs 612 for the first SSB 605 are equal to 100 and that the values of the LSBs 616 for the second SSB 607 are equal to 101. Based on the larger gap 622 between SSBs 605 and 607, relative to the gap 620 between SSBs 601 and 603 of FIG. 6B, and based on the values of the LSBs, the UE determines that the MSB values are 0X1 and 1X0 for SSBs 605 and 607, respectively. In other words, the UE determines two of the three values of the MSBs 610, 614 and that the middle MSB value is the same for both SSBs 605, 607. The decoding speed and power consumption are represented by a performance value P3, which is improved over P2 (e.g., lower power consumption and/or faster decoding speed).

Figure 6D:
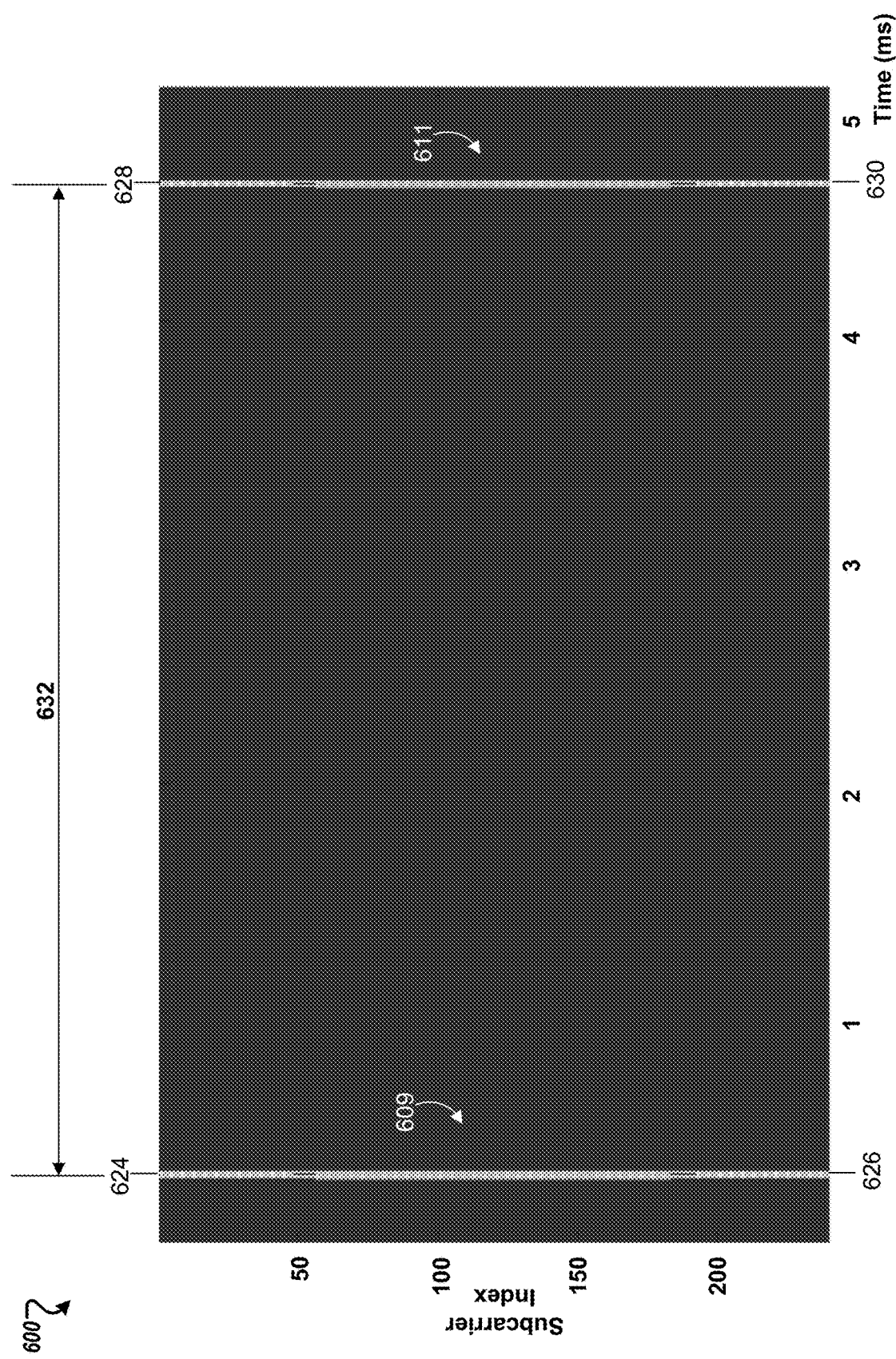

FIG. 6D shows a scenario for decoding SSBs of an SSB burst 600 by the UE. The base station sends two SSBs 609, 611, with respective indices 000100 and 111101. The MSBs 624 of the first SSB 609 are equal to values 000, and the LSBs 626 of the first SSB 609 are equal to values 100. The MSBs 628 of the second SSB 611 are equal to values 111, and the LSBs 630 of the second SSB 611 are equal to values 101. The UE determines the values of the LSBs 626 for the first SSB 609 are equal to 100 and that the values of the LSBs 630 for the second SSB 611 are equal to 101. Based on the larger gap 632 between SSBs 609 and 611, relative to the gap 622 between SSBs 605 and 607 of FIG. 6C, and based on the values of the LSBs, the UE determines (infers) that the MSB values are 000 and 111 for SSBs 609 and 611, respectively. In other words, the UE determines all the values of the MSBs 624, 628. Because the gap 632 is large enough, there is only one possible set of values for each index of SSB 609 and SSB 611. The UE does not have to decode any MSBs. The decoding speed and power consumption are represented by a performance value P4, which is improved over P3 (e.g., lower power consumption and/or faster decoding speed).

Figure 7:
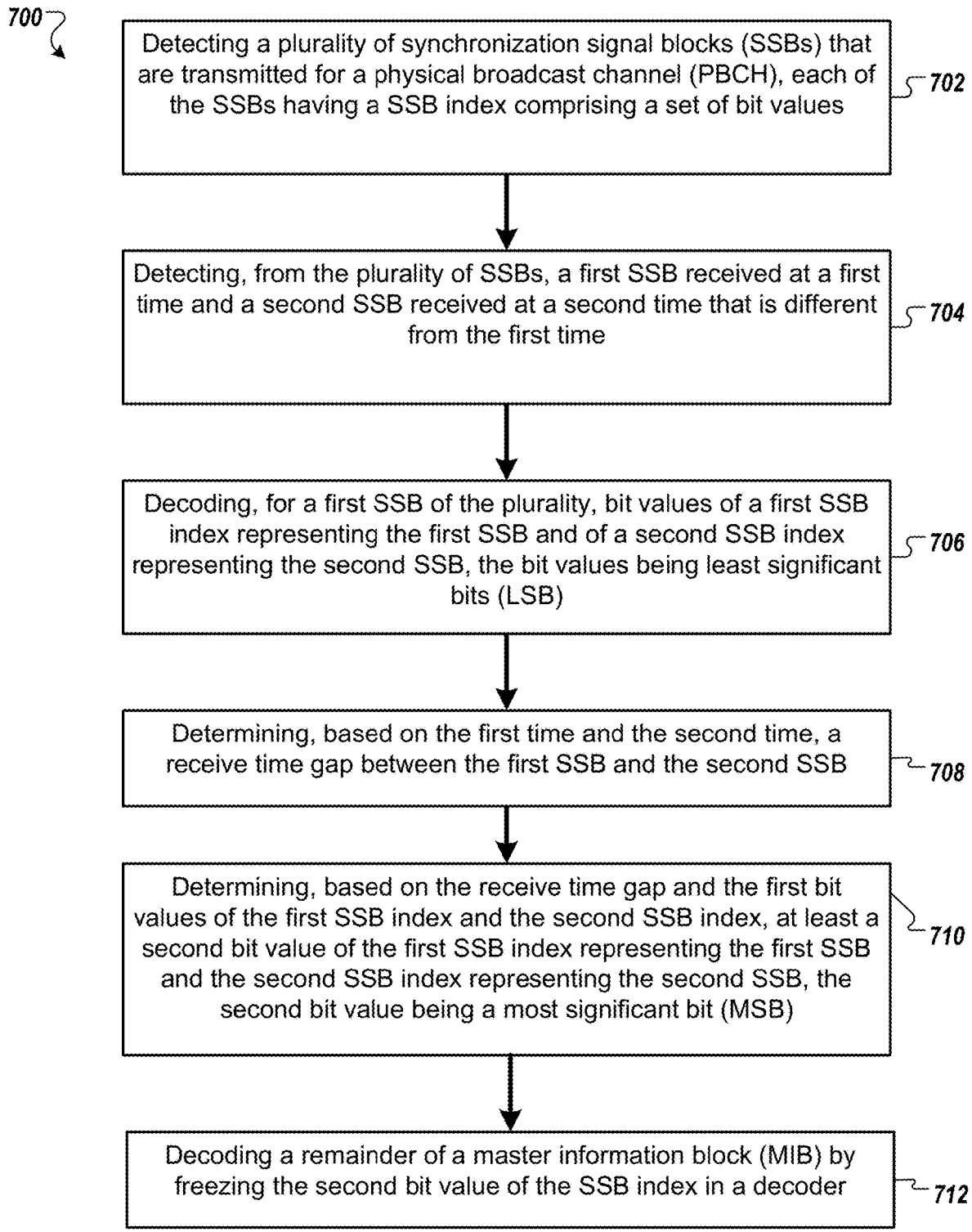
FIG. 7 illustrates a flowchart of an example method, in accordance with some embodiments.

FIG. 7 illustrates a flowchart of an example method V100, in accordance with some embodiments. For clarity of presentation, the description that follows generally describes method V100 in the context of the other figures in this description. For example, method V100 can be performed by UE 102 of FIG. 1. It will be understood that method V100 can be performed, for example, by any suitable system, environment, software, hardware, or a combination of systems, environments, software, and hardware, as appropriate. In some implementations, various steps of method V100 can be run in parallel, in combination, in loops, or in any order.

Example method 700 includes detecting (702) a plurality of synchronization signal blocks (SSBs) that are transmitted for a physical broadcast channel (PBCH), each of the SSBs having a SSB index comprising a set of bit values. In some implementations, detecting the plurality of SSBs comprises receiving, by a user equipment and from a base station, an SSB burst comprising the plurality of SSBs, and wherein the SSB index for each of the SSBs is carried within the SSB by a PBCH demodulation reference signal (DMRS). In some implementations, the plurality of SSBs are received on a plurality of received beams. In some implementations, the SSB index includes at least one most significant bit (MSB) and at least one least significant bit (LSB) of the SSB, wherein the MSB is part of a PBCH payload and wherein the LSB is part of a DMRS sequence.

The method 700 includes detecting (704), from the plurality of SSBs, a first SSB received at a first time and a second SSB received at a second time that is different from the first time. The method includes decoding (706), for a first SSB of the plurality, bit values of a first SSB index representing the first SSB and of a second SSB index representing the second SSB, the bit values being least significant bits (LSB). The method includes determining (708), based on the first time and the second time, a receive time gap between the first SSB and the second SSB. In some implementations, determining the receive time gap includes determining a subcarrier spacing (SCS) associated with the plurality of SSBs. In some implementations, determining the receive time gap includes a center frequency associated with the PBCH. In some implementations, determining the receive time gap includes determining, based on the first time, the second time, the SCS, and the center frequency, a number of symbols between the first SSB and the second SSB. In some implementations, a center frequency is in FR2.

The method 700 includes determining (710), based on the receive time gap and the first bit values of the first SSB index and the second SSB index, at least a second bit value of the first SSB index representing the first SSB and the second SSB index representing the second SSB, the second bit value being a most significant bit (MSB). The second bit value is also called an inferred bit. In some implementations, determining at least one bit value of a second SSB index representing the second SSB includes determining at least one MSB of the second SSB index without decoding any MSBs of the second SSB index.

The method 700 includes decoding (712) a remainder of a master information block (MIB) by freezing the second bit value of the SSB index in a decoder. In some implementations, the second bit value for each of the first and second SSBs are MSB(s) of each respective first and second SSB index. The second bit values for each SSB index are used as frozen bits in the polar decoder because each of these bits are part of the PBCH payload. The UE thus uses the inferred bits to decode the rest of the MIB and PBCH payload.

The example method 700 shown in FIG. 7 can be modified or reconfigured to include additional, fewer, or different steps (not shown in FIG. 7), which can be performed in the order shown or in a different order. In some implementations, the at least one bit value of the second SSB index is set as a frozen bit for a decoder, wherein the frozen bit reduces a decoding time of the decoder relative to another decoding time that occurs without the frozen bit. In some implementations, the at least one bit value of the second SSB index is set as a frozen bit for a decoder, wherein the frozen bit improves error correction of the decoder relative to another error correction that occurs without the frozen bit. In some implementations, determining the at least one bit value of the second SSB index representing the second SSB comprises determining three MSB values of the second SSB index without decoding any bit values of the second SSB index.

In some implementations, the method 700 includes determining, based on the receive time gap, one or more bit values of the first SSB index without decoding the one or more bit values of the first SSB index. In some implementations, the method 700 includes determining an interleave pattern associated with the plurality of SSBs. In some implementations, the method 700 includes determining, based on the interleave pattern, the at least one bit value of the SSB index representing the second SSB.

Figure 8:
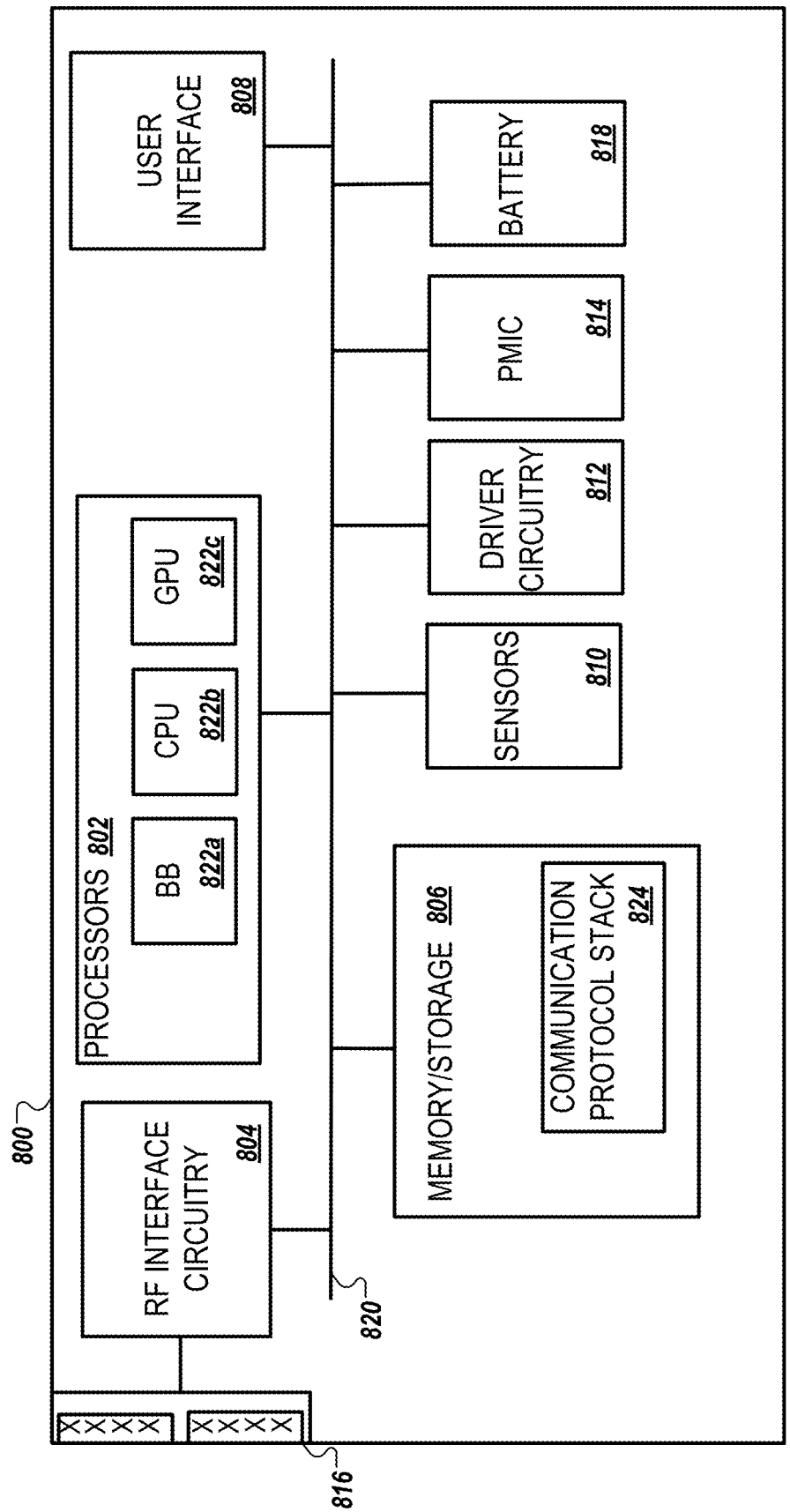
FIG. 8 illustrates a user equipment (UE), in accordance with some embodiments.

FIG. 8 illustrates a UE 800, in accordance with some embodiments. The UE 800 may be similar to and substantially interchangeable with UE 102 of FIG. 1. The UE 800 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 800 may include processors 802, RF interface circuitry 804, memory/storage 806, user interface 808, sensors 810, driver circuitry 812, power management integrated circuit (PMIC) 814, antenna structure 816, and battery 818. The components of the UE 800 may be implemented as integrated circuits (ICs), portions thereof, discrete electronic devices, or other modules, logic, hardware, software, firmware, or a combination thereof. The block diagram of FIG. 8 is intended to show a high-level view of some of the components of the UE 800. However, some of the components shown may be omitted, additional components may be present, and different arrangement of the components shown may occur in other implementations.

The components of the UE 800 may be coupled with various other components over one or more interconnects 820, which may represent any type of interface, input/output, bus (local, system, or expansion), transmission line, trace, optical connection, etc. that allows various circuit components (on common or different chips or chipsets) to interact with one another.

The processors 802 may include processor circuitry such as, for example, baseband processor circuitry (BB) 822A, central processor unit circuitry (CPU) 822B, and graphics processor unit circuitry (GPU) 822C. The processors 802 may include any type of circuitry or processor circuitry that executes or otherwise operates computer-executable instructions, such as program code, software modules, or functional processes from memory/storage 806 to cause the UE 800 to perform operations as described herein.

In some embodiments, the baseband processor circuitry 822A may access a communication protocol stack 824 in the memory/storage 806 to communicate over a 3GPP compatible network. In general, the baseband processor circuitry 822A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 804. The baseband processor circuitry 822A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 806 may include one or more non-transitory, computer-readable media that includes instructions (for example, communication protocol stack 824) that may be executed by one or more of the processors 802 to cause the UE 800 to perform various operations described herein. The memory/storage 806 include any type of volatile or non-volatile memory that may be distributed throughout the UE 800. In some embodiments, some of the memory/storage 806 may be located on the processors 802 themselves (for example, L1 and L2 cache), while other memory/storage 806 is external to the processors 802 but accessible thereto via a memory interface. The memory/storage 806 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 804 may include transceiver circuitry and radio frequency front module (RFEM) that allows the UE 800 to communicate with other devices over a radio access network. The RF interface circuitry 804 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 816 and proceed to filter and amplify (with a low-noise amplifier) the signal. The signal may be provided to a receiver of the transceiver that downconverts the RF signal into a baseband signal that is provided to the baseband processor of the processors 802.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 816.

In various embodiments, the RF interface circuitry 804 may be configured to transmit/receive signals in a manner compatible with NR access technologies.

The antenna 816 may include antenna elements to convert electrical signals into radio waves to travel through the air and to convert received radio waves into electrical signals. The antenna elements may be arranged into one or more antenna panels. The antenna 816 may have antenna panels that are omnidirectional, directional, or a combination thereof to enable beamforming and multiple input, multiple output communications. The antenna 816 may include microstrip antennas, printed antennas fabricated on the surface of one or more printed circuit boards, patch antennas, phased array antennas, etc. The antenna 816 may have one or more panels designed for specific frequency bands including bands in FR1 or FR2.

The user interface 808 includes various input/output (I/O) devices designed to enable user interaction with the UE 800. The user interface 808 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs), or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 800.

The sensors 810 may include devices, modules, or subsystems whose purpose is to detect events or changes in its environment and send the information (sensor data) about the detected events to some other device, module, subsystem, etc. Examples of such sensors include, inter alia, inertia measurement units including accelerometers, gyroscopes, or magnetometers; microelectromechanical systems or nanoelectromechanical systems including 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 812 may include software and hardware elements that operate to control particular devices that are embedded in the UE 800, attached to the UE 800, or otherwise communicatively coupled with the UE 800. The driver circuitry 812 may include individual drivers allowing other components to interact with or control various input/output (I/O) devices that may be present within, or connected to, the UE 800. For example, driver circuitry 812 may include a display driver to control and allow access to a display device, a touchscreen driver to control and allow access to a touchscreen interface, sensor drivers to obtain sensor readings of sensor circuitry 828 and control and allow access to sensor circuitry 828, drivers to obtain actuator positions of electro-mechanic components or control and allow access to the electro-mechanic components, a camera driver to control and allow access to an embedded image capture device, audio drivers to control and allow access to one or more audio devices.

The PMIC 814 may manage power provided to various components of the UE 800. In particular, with respect to the processors 802, the PMIC 814 may control power-source selection, voltage scaling, battery charging, or DC-to-DC conversion.

In some embodiments, the PMIC 814 may control, or otherwise be part of, various power saving mechanisms of the UE 800 including DRX as discussed herein. A battery 818 may power the UE 800, although in some examples the UE 800 may be mounted deployed in a fixed location, and may have a power supply coupled to an electrical grid. The battery 818 may be a lithium ion battery, a metal-air battery, such as a zinc-air battery, an aluminum-air battery, a lithium-air battery, and the like. In some implementations, such as in vehicle-based applications, the battery 818 may be a typical lead-acid automotive battery.

Figure 9:
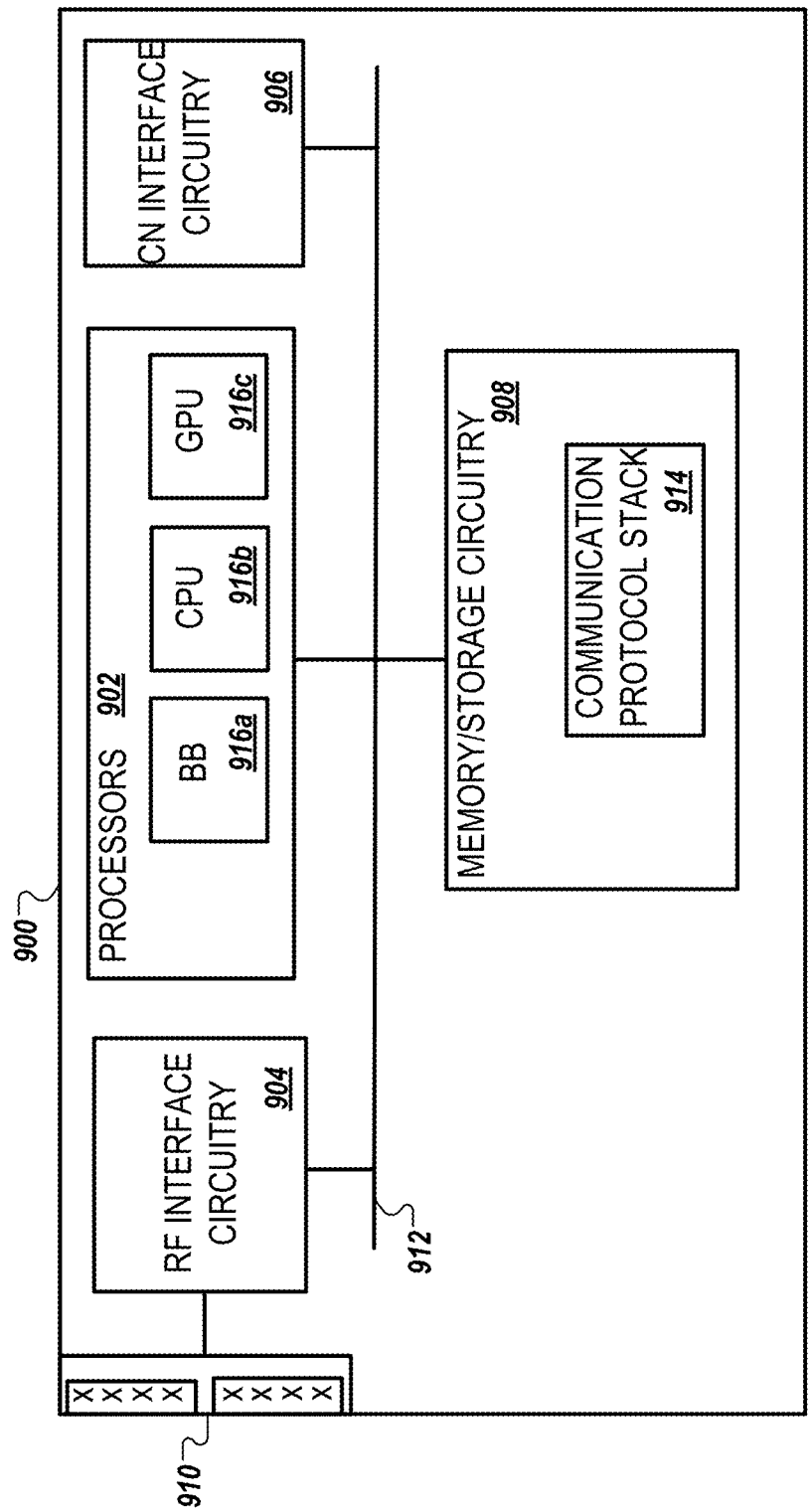
FIG. 9 illustrates an access node, in accordance with some embodiments.

FIG. 9 illustrates an access node 900 (e.g., a base station or gNB), in accordance with some embodiments. The access node 900 may be similar to and substantially interchangeable with base station 104. The access node 900 may include processors 902, RF interface circuitry 904, core network (CN) interface circuitry 906, memory/storage circuitry 908, and antenna structure 910.

The components of the access node 900 may be coupled with various other components over one or more interconnects 912. The processors 902, RF interface circuitry 904, memory/storage circuitry 908 (including communication protocol stack 914), antenna structure 910, and interconnects 912 may be similar to like-named elements shown and described with respect to FIG. 8. For example, the processors 902 may include processor circuitry such as, for example, baseband processor circuitry (BB) 916A, central processor unit circuitry (CPU) 916B, and graphics processor unit circuitry (GPU) 916C.

The CN interface circuitry 906 may provide connectivity to a core network, for example, a 5th Generation Core network (5GC) using a 5GC-compatible network interface protocol such as carrier Ethernet protocols, or some other suitable protocol. Network connectivity may be provided to/from the access node 900 via a fiber optic or wireless backhaul. The CN interface circuitry 906 may include one or more dedicated processors or FPGAs to communicate using one or more of the aforementioned protocols. In some implementations, the CN interface circuitry 906 may include multiple controllers to provide connectivity to other networks using the same or different protocols.

As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to an access node 900 that operates in an NR or 5G system (for example, a gNB), and the term "E-UTRAN node" or the like may refer to an access node 900 that operates in an LTE or 4G system (e.g., an eNB). According to various embodiments, the access node 900 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the access node 900 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by the access node 900; a MAC/PHY split wherein RRC, PDCP, RLC, and MAC layers are operated by the CRAN/vBBUP and the PHY layer is operated by the access node 900; or a "lower PHY" split wherein RRC, PDCP, RLC, MAC layers and upper portions of the PHY layer are operated by the CRAN/vBBUP and lower portions of the PHY layer are operated by the access node 900.

In V2X scenarios, the access node 900 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method for master information block decoding based on synchronization signal block timing. The method includes detecting a plurality of synchronization signal blocks (SSBs) that are transmitted for a physical broadcast channel (PBCH), each of the SSBs having a SSB index comprising a set of bit values. The method includes detecting, from the plurality of SSBs, a first SSB received at a first time and a second SSB received at a second time that is different from the first time. The method includes decoding, for a first SSB of the plurality, first bit values of a first SSB index representing the first SSB and of a second SSB index representing the second SSB. Generally, the first bit values are the LSBs of the SSB indexes. The method includes determining, based on the first time and the second time, a receive time gap between the first SSB and the second SSB. The method includes determining, based on the receive time gap and the first bit values of the first SSB index and the second SSB index, at least a second bit value of the first second SSB index representing the first SSB and the second SSB representing the second SSB. Generally, the second bit value is an MSB value for each of the SSB indexes.

Example 2 may include the method described in example 1, the SSB index including at least one most significant bit (MSB) and least significant bits (LSBs) of the SSB, wherein the MSB is part of a PBCH payload, wherein the LSB is part of a DMRS sequence.

Example 3 may include the method described in any of examples 1-2, wherein determining the second bit value of the first second SSB index representing the first SSB and the second SSB representing the second SSB comprises determining at least one MSB of a particular SSB index without decoding any MSBs of the particular SSB index.

Example 4 may include the method described in any of examples 1-3, wherein the second bit value is set as a frozen bit for a decoder, wherein the frozen bit reduces a decoding time of the decoder relative to another decoding time that occurs without the frozen bit.

Example 5 may include the method described in any of examples 1-4, wherein the second bit value is set as a frozen bit for a decoder, wherein the frozen bit improves error correction of the decoder relative to another error correction that occurs without the frozen bit.

Example 6 may include the method described in any of examples 1-5, wherein determining the second bit value comprises determining a plurality of MSB values of each of the first SSB index and the second SSB index without decoding those MSB values.

Example 7 may include the method described in any of examples 1-7, wherein determining the receive time gap includes determining a subcarrier spacing (SCS) associated with the plurality of SSBs; determining a center frequency associated with the PBCH; and determining, based on the first time, the second time, the SCS, and the center frequency, a number of symbols between the first SSB and the second SSB.

Example 8 may include the method described in any of examples 1-8, wherein a center frequency is in FR1.

Example 9 may include the method described in any of examples 1-9, wherein the center frequency is in FR2.

Example 10 may include the method described in any of examples 1-9, further including determining an interleave pattern associated with the plurality of SSBs; and determining, based on the interleave pattern, the at least one bit value of the SSB index representing the second SSB.

Example 11 may include the method described in any of examples 1-10, wherein detecting a plurality of SSBs comprises receiving, by a user equipment and from a base station, an SSB burst comprising the plurality of SSBs, and wherein the SSB index for each of the SSBs is carried within the SSB by a PBCH demodulation reference signal (DMRS).

Example 12 may include the method described in any of examples 1-11, wherein the plurality of SSBs are received on a plurality of received beams.

Example 13 includes an apparatus comprising one or more baseband processors configured to perform operations that include detecting a plurality of synchronization signal blocks (SSBs) that are transmitted for a physical broadcast channel (PBCH), each of the SSBs having a SSB index comprising a set of bit values; detecting, from the plurality of SSBs, a first SSB received at a first time and a second SSB received at a second time that is different from the first time; decoding, for a first SSB of the plurality, at least one bit value of a first SSB index representing the first SSB; determining, based on the first time and the second time, a receive time gap between the first SSB and the second SSB; and based on the receive time gap and the at least one bit value of the first SSB index, determining at least one bit value of a second SSB index representing the second SSB.

Example 14 may include the method described in example 14, the SSB index including at least one most significant bit (MSB) and at least one least significant bit (LSB) of the SSB, wherein the MSB is part of a PBCH payload and wherein the LSB is part of a DMRS sequence.

Example 15 may include the method described in any of examples 14-15, wherein determining at least one bit value of a second SSB index representing the second SSB comprises determining at least one MSB of the second SSB index without decoding any MSBs of the second SSB index.

Example 16 may include the method described in any of examples 14-16, wherein the at least one bit value of the second SSB index is set as a frozen bit for a decoder, wherein the frozen bit reduces a decoding time of the decoder relative to another decoding time that occurs without the frozen bit.

Example 17 may include the method described in any of examples 14-17, wherein the at least one bit value of the second SSB index is set as a frozen bit for a decoder, wherein the frozen bit improves error correction of the decoder relative to another error correction that occurs without the frozen bit.

Example 18 may include the method described in any of examples 14-18, wherein determining the at least one bit value of the second SSB index representing the second SSB comprises determining three MSB values of the second SSB index without decoding any bit values of the second SSB index.

Example 19 may include the method described in any of examples 14-20, wherein determining the receive time gap includes determining a subcarrier spacing (SCS) associated with the plurality of SSBs; determining a center frequency associated with the PBCH; and determining, based on the first time, the second time, the SCS, and the center frequency, a number of symbols between the first SSB and the second SSB.

Example 20 may include the method described in any of examples 14-21, wherein a center frequency is in FR1.

Example 21 may include the method described in any of examples 14-22, wherein the center frequency is in FR2.

Example 22 may include the method described in any of examples 14-23, further including determining an interleave pattern associated with the plurality of SSBs; and determining, based on the interleave pattern, the at least one bit value of the SSB index representing the second SSB.

Example 23 may include the method described in any of examples 14-24, wherein detecting a plurality of SSBs comprises receiving, by a user equipment and from a base station, an SSB burst comprising the plurality of SSBs, and wherein the SSB index for each of the SSBs is carried within the SSB by a PBCH demodulation reference signal (DMRS).

Example 24 may include the method described in any of examples 14-25, wherein the plurality of SSBs are received on a plurality of received beams.

Example 25 may include a user equipment comprising one or more processors configured to perform the method of any of examples 1 to 12.

Example 26 may include one or more non-transitory computer-readable media including instructions to cause an electronic device, upon execution of the instructions by one or more processors of the electronic device, to perform one or more elements of a method described in or related to any of examples 1-12, or any other method or process described herein.

Example 27 may include an apparatus including logic, modules, or circuitry to perform one or more elements of a method described in or related to any of examples 1-12, or any other method or process described herein.

Example 28 may include a method, technique, or process as described in or related to any of examples 1-23, or portions or parts thereof.

Example 29 may include an apparatus including: one or more processors and one or more computer-readable media including instructions that, when executed by the one or more processors, cause the one or more processors to perform the method, techniques, or process as described in or related to any of examples 1-12, or portions thereof.

Example 30 may include a signal as described in or related to any of examples 1-23, or portions or parts thereof.

Example 31 may include a datagram, information element, packet, frame, segment, PDU, or message as described in or related to any of examples 1-23, or portions or parts thereof, or otherwise described in the present disclosure.

Example 32 may include a signal encoded with data as described in or related to any of examples 1-23, or portions or parts thereof, or otherwise described in the present disclosure.

Example 33 may include a signal encoded with a datagram, IE, packet, frame, segment, PDU, or message as described in or related to any of examples 1-23, or portions or parts thereof, or otherwise described in the present disclosure.

Example 34 may include an electromagnetic signal carrying computer-readable instructions, wherein execution of the computer-readable instructions by one or more processors is to cause the one or more processors to perform the method, techniques, or process as described in or related to any of examples 1-23, or portions thereof.

Example 35 may include a computer program including instructions, wherein execution of the program by a processing element is to cause the processing element to carry out the method, techniques, or process as described in or related to any of examples 1-12, or portions thereof. The operations or actions performed by the instructions executed by the processing element can include the methods of any one of examples 1-12.

Example 36 may include a signal in a wireless network as shown and described herein.

Example 37 may include a method of communicating in a wireless network as shown and described herein.

Example 38 may include a system for providing wireless communication as shown and described herein. The operations or actions performed by the system can include the methods of any one of examples 1-12.

Example 39 may include a device for providing wireless communication as shown and described herein. The operations or actions performed by the device can include the methods of any one of examples 1-12.

The previously-described examples 1-12 are implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

A system, e.g., a base station, an apparatus including one or more baseband processors, and so forth, can be configured to perform particular operations or actions by virtue of having software, firmware, hardware, or a combination of them installed on the system that in operation causes or cause the system to perform the actions. The operations or actions performed either by the system can include the methods of any one of examples 1-12.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method comprising:
   detecting a plurality of synchronization signal blocks (SSBs) that are transmitted for a physical broadcast channel (PBCH), each of the SSBs having a SSB index comprising a set of bit values;
   detecting, from the plurality of SSBs, a first SSB received at a first time and a second SSB received at a second time that is different from the first time;
   decoding, for the first SSB of the plurality, first bit values of a first SSB index representing the first SSB and first bit values of a second SSB index representing the second SSB;
   determining, based on the first time and the second time, a receive time gap between the first SSB and the second SSB;
   determining, based on the receive time gap and the first bit values of the first SSB index and the first bit values of the second SSB index, at least one second bit value of the first SSB index representing the first SSB and the second SSB index representing the second SSB; and
   decoding a master information block (MIB) of a target cell using the at least one second bit value as a frozen bit.

2. The method of claim 1, the SSB index including at least one most significant bit (MSB) and least significant bits (LSBs), wherein the MSB is part of a PBCH payload, wherein the LSB is part of a DMRS sequence, wherein the second bit value is a MSB of the SSB index, and wherein the first bit values are LSBs of the SSB index.

3. The method of claim 2, wherein determining the second bit value of the first SSB index representing the first SSB and the second SSB index representing the second SSB comprises determining at least one MSB of a particular SSB index without decoding any MSBs of the particular SSB index.

4. The method of claim 1, wherein the second bit value is set as a frozen bit for a decoder, wherein the frozen bit reduces a decoding time of the decoder relative to another decoding time that occurs without the frozen bit.

5. The method of claim 1, wherein the second bit value is set as a frozen bit for a decoder, wherein the frozen bit improves error correction of the decoder relative to another error correction that occurs without the frozen bit.

6. The method of claim 1, wherein determining the second bit value comprises determining a plurality of MSB values of each of the first SSB index and the second SSB index without decoding those MSB values.

7. The method of claim 1, wherein determining the receive time gap comprises:
   determining a subcarrier spacing (SCS) associated with the plurality of SSBs;
   determining a center frequency associated with the PBCH; and
   determining, based on the first time, the second time, the SCS, and the center frequency, a number of symbols between the first SSB and the second SSB.

8. The method of claim 7, wherein the subcarrier spacing is 120 kilohertz (kHz) or 240 kHz.

9. The method of claim 7, wherein the center frequency is in FR2.

10. The method of claim 1, further comprising:
    determining an interleave pattern associated with the plurality of SSBs; and
    determining, based on the interleave pattern, the second bit value of the first SSB index representing the first SSB and the second SSB representing the second SSB index.

11. The method of claim 1, wherein detecting a plurality of SSBs comprises receiving, by a user equipment and from a base station, an SSB burst comprising the plurality of SSBs, and wherein the SSB index for each of the SSBs is carried within the SSB by a PBCH demodulation reference signal (DMRS).

12. The method of claim 1, wherein the plurality of SSBs are received on a plurality of received beams.

13. An apparatus comprising one or more baseband processors configured to perform operations comprising:
    detecting a plurality of synchronization signal blocks (SSBs) that are transmitted for a physical broadcast channel (PBCH), each of the SSBs having a SSB index comprising a set of bit values;
    detecting, from the plurality of SSBs, a first SSB received at a first time and a second SSB received at a second time that is different from the first time;
    decoding, for the first SSB of the plurality, first bit values of a first SSB index representing the first SSB and first bit values of a second SSB index representing the second SSB;
    determining, based on the first time and the second time, a receive time gap between the first SSB and the second SSB;
    determining, based on the receive time gap and the first bit values of the first SSB index and the first bit values of the second SSB index, at least one second bit value of the first SSB index representing the first SSB and the second SSB representing the second SSB index; and
    decoding a master information block (MIB) of a target cell using the at least one second bit value as a frozen bit.

14. The apparatus of claim 13, the SSB index including at least one most significant bit (MSB) and least significant bits (LSBs), wherein the MSB is part of a PBCH payload, wherein the LSB is part of a DMRS sequence, wherein the second bit value is a MSB of the SSB index, and wherein the first bit values are LSBs of the SSB index.

15. The apparatus of claim 14, wherein determining the second bit value of the first SSB index representing the first SSB and the second SSB index representing the second SSB comprises determining at least one MSB of a particular SSB index without decoding any MSBs of the particular SSB index.

16. The apparatus of claim 13, wherein the second bit value is set as a frozen bit for a decoder, wherein the frozen bit reduces a decoding time of the decoder relative to another decoding time that occurs without the frozen bit.

17. The apparatus of claim 13, wherein the at least one bit value of the second SSB index is set as a frozen bit for a decoder, wherein the frozen bit improves error correction of the decoder relative to another error correction that occurs without the frozen bit.

18. The apparatus of claim 13, wherein determining the second bit value comprises determining a plurality of MSB values of each of the first SSB index and the second SSB index without decoding those MSB values.

19. The apparatus of claim 13, wherein determining the receive time gap comprises:
    determining a subcarrier spacing (SCS) associated with the plurality of SSBs;
    determining a center frequency associated with the PBCH; and determining, based on the first time, the second time, the SCS, and the center frequency, a number of symbols between the first SSB and the second SSB.

20. The apparatus of claim 19, wherein the subcarrier spacing is 120 k Hz or 240 kHz.

* * * * *